US011662006B2

(12) United States Patent
Osada et al.

(10) Patent No.: US 11,662,006 B2
(45) Date of Patent: May 30, 2023

(54) DIFFERENTIAL GEAR MECHANISM AND METHOD FOR DESIGNING THE SAME

(71) Applicant: AISIN CORPORATION, Kariya (JP)

(72) Inventors: Tomoya Osada, Kariya (JP); Yoshihiko Inukai, Kariya (JP)

(73) Assignee: AISIN CORPORATION, Kariya (JP)

( * ) Notice: Subject to any disclaimer, the term of this patent is extended or adjusted under 35 U.S.C. 154(b) by 152 days.

(21) Appl. No.: 17/420,169

(22) PCT Filed: Mar. 24, 2020

(86) PCT No.: PCT/JP2020/012835
§ 371 (c)(1),
(2) Date: Jul. 1, 2021

(87) PCT Pub. No.: WO2020/203433
PCT Pub. Date: Oct. 8, 2020

(65) Prior Publication Data
US 2022/0065339 A1    Mar. 3, 2022

(30) Foreign Application Priority Data

Mar. 29, 2019    (JP) .............................. JP2019-065689

(51) Int. Cl.
*F16H 48/08*    (2006.01)
*F16H 55/08*    (2006.01)
*F16H 55/22*    (2006.01)

(52) U.S. Cl.
CPC ............. *F16H 48/08* (2013.01); *F16H 55/08* (2013.01); *F16H 55/22* (2013.01)

(58) Field of Classification Search
CPC ........... F16H 48/08; F16H 55/08; F16H 55/22
(Continued)

(56) References Cited

U.S. PATENT DOCUMENTS 4,244,243 A * 1/1981 McCaw .................. F16H 48/08
475/236
5,505,668 A * 4/1996 Koriakov-Savoysky .....................
F16H 1/32
74/462

(Continued)

FOREIGN PATENT DOCUMENTS

JP    2017009108 A *  1/2017 ............. F16H 48/00
JP    2018-135964 A    8/2018

OTHER PUBLICATIONS

International Search Report for PCT/JP2020/012835 dated Jun. 16, 2020 [PCT/ISA/210].

*Primary Examiner* — Leslie A Nicholson, III
(74) *Attorney, Agent, or Firm* — Sughrue Mion, PLLC

(57) ABSTRACT

A differential gear mechanism in which when a plurality of contact lines between a gear tooth and a pinion tooth is defined on either a tooth surface of the gear tooth of a crown gear or a tooth surface of the pinion tooth of a pinion gear at a predetermined angle around an axis of the pinion gear, and the plurality of contact lines and a center line of a pinion tooth bottom surface of the pinion gear are projected onto a plane, including an axis of a pair of the crown gears, around the axis of the pinion gear, the center line of the pinion tooth bottom surface projected onto the plane includes an inclined line passing through a range between two of the contact lines which are selected from the plurality of contact lines projected onto the plane and by which a contact ratio is 1.0 or higher.

15 Claims, 4 Drawing Sheets

(58) Field of Classification Search
USPC .......................................................... 475/230
See application file for complete search history.

(56) References Cited

U.S. PATENT DOCUMENTS

| | | | | |
|---|---|---|---|---|
| 5,533,943 | A * | 7/1996 | Ichioka | .................... F16H 1/28 |
| | | | | 475/221 |
| 6,282,502 | B1 * | 8/2001 | Sundaresan | ............. F16H 55/08 |
| | | | | 700/98 |
| 6,976,556 | B2 * | 12/2005 | Shimizu | ............... B62D 5/0409 |
| | | | | 180/444 |
| 7,849,758 | B2 * | 12/2010 | Katz | ....................... F16H 55/08 |
| | | | | 74/462 |
| 9,022,893 | B2 * | 5/2015 | Hirao | ...................... F16H 57/02 |
| | | | | 475/230 |
| 9,512,898 | B2 * | 12/2016 | Tanaka | ...................... F16H 1/16 |
| 10,118,693 | B2 * | 11/2018 | Lieder | .................... B64C 27/12 |
| 10,174,826 | B2 * | 1/2019 | Nagata | .................... F16H 55/08 |
| 10,527,149 | B2 * | 1/2020 | Berlinger, Jr. | .......... F16H 55/17 |
| 2002/0170374 | A1 * | 11/2002 | Stewart | .................. F16H 55/08 |
| | | | | 74/462 |
| 2012/0021863 | A1 * | 1/2012 | Hirao | ...................... F16H 48/06 |
| | | | | 74/424 |

* cited by examiner

DIFFERENTIAL GEAR MECHANISM AND METHOD FOR DESIGNING THE SAME

CROSS REFERENCE TO RELATED APPLICATIONS

This application is a National Stage of International Application No. PCT/JP2020/012835 filed Mar. 24, 2020, claiming priority based on Japanese Patent Application No. 2019-065689 filed Mar. 29, 2019, the contents of which are incorporated by reference in their entirety.

TECHNICAL FIELD

The present disclosure relates to differential gear mechanisms each including a pair of crown gears and a plurality of pinion gears in mesh with the pair of crown gears and methods for designing the differential gear mechanisms.

BACKGROUND ART

Differential gear mechanisms of this type known in the related art include a face gear transmission device that continuously repeats meshing of a single tooth of a face gear (crown gear) and a single tooth of a pinion gear and meshing of two neighboring teeth of the face gear and two neighboring teeth of the pinion gear (see, for example, Patent Document 1). In the face gear transmission device, the outer end side of a tooth surface of the face gear has a continuous shape connecting, through a line, an outer end reference point with any point between a position on a tooth tip of the tooth surface located inward of an outer end thereof and a tooth tip reference point. The outer end reference point is an intersection of the outer end of the tooth surface and a meshing contact line that is an endpoint of single-tooth meshing. The tooth tip reference point is an intersection of the tooth tip of the tooth surface and a meshing advance line. Thus, during two-neighboring-tooth meshing, the length of a single-tooth meshing contact line preceding in the direction of rotation decreases gradually. This reduces a sudden change in the meshing contact line length that occurs when a transition is made from the end of two-neighboring-tooth meshing to the start of single-tooth meshing.

RELATED ART DOCUMENTS

Patent Documents

Patent Document 1: Japanese Unexamined Patent Application Publication No. 2018-135964 (JP 2018-135964 A)

SUMMARY OF THE DISCLOSURE

Problem to be Solved by Various Aspects of the Disclosure

A differential gear mechanism including a pair of crown gears, such as one described above, may have its pinion gears reduced in diameter so as to reduce the dimension (axial length) of the pair of crown gears in an axial direction, thus making an entirety of the mechanism compact in size. Reducing the pinion gears in diameter, however, may increase stress acting on the tooth roots of pinion teeth of the pinion gears in a region adjacent to the outer periphery of the crown gears during, in particular, high torque transmission, which may reduce the durability of the pinion gears. A solution to this problem may be for a tooth tip surface of each gear tooth of the crown gears to include a portion inclined such that the tooth tip surface approaches a tooth bottom as the tooth tip surface extends from a region adjacent to the axis of the crown gears toward a region adjacent to the outer periphery of the crown gears. In this case, each pinion tooth bottom surface located between adjacent pinion teeth of each pinion gear may be inclined such that the pinion tooth bottom surface approaches a pinion tooth tip as the pinion tooth bottom surface extends from a region adjacent to the axis of the crown gears toward a region adjacent to the outer periphery of the crown gears. Thus, if each pinion gear is reduced in diameter, a distance (thickness) between each pinion tooth bottom surface (root circle) and the inner peripheral surface of the pinion gear (pinion shaft hole) would be increased in a region adjacent to the outer periphery of the crown gears. If the thickness of a portion of each pinion gear inward of the pinion tooth bottom surface is increased as just described, however, stress acting on the tooth roots of the pinion teeth may unfortunately rather increase in accordance with meshing of the pinion teeth with the gear teeth of the crown gears depending on the shape of each pinion tooth bottom surface (e.g., the degree of inclination thereof).

Accordingly, an aspect of the present disclosure is to provide a compact differential gear mechanism including a pair of crown gears and a plurality of pinion gears in mesh with the pair of crown gears while increasing the durability of each pinion gear.

Means for Solving the Problem

A differential gear mechanism according to the present disclosure is a differential gear mechanism including a pair of crown gears and a plurality of pinion gears in mesh with the pair of crown gears. A tooth tip surface of each gear tooth of the crown gears includes an inclined portion inclined such that the tooth tip surface approaches a tooth bottom as the tooth tip surface extends from a region adjacent to an axis of the pair of crown gears toward a region adjacent to an outer periphery of the pair of crown gears. Each pinion tooth bottom surface located between adjacent pinion teeth of the pinion gears includes an inclined portion inclined such that the pinion tooth bottom surface approaches a pinion tooth tip as the pinion tooth bottom surface extends from a region adjacent to the axis of the pair of crown gears toward a region adjacent to the outer periphery of the pair of crown gears. When a plurality of contact lines between the gear tooth and the pinion tooth is defined on either a tooth surface of the gear tooth of the crown gear or a tooth surface of the pinion tooth of the pinion gear at a predetermined angle around an axis of the pinion gear, and the plurality of contact lines and a center line of the tooth tip surface of the gear tooth are projected onto a plane, including the axis of the pair of crown gears, around the axis of the pinion gear, the center line of the tooth tip surface projected onto the plane includes an inclined line passing through a range between two of the contact lines which are selected from the plurality of contact lines projected onto the plane and by which a contact ratio is 1.0 or higher.

The differential gear mechanism according to the present disclosure is designed such that the center line of the tooth tip surface of the gear tooth of the crown gear, projected onto the plane including the axis of the pair of crown gears, includes the inclined line passing through the range between two of the contact lines which are selected from the plurality of contact lines between the gear tooth of the crown gear and the pinion tooth projected onto the plane and by which the contact ratio is 1.0 or higher. Thus, forming the inclined portion on each pinion tooth bottom surface of the pinion gears such that each pinion tooth bottom surface does not interfere with the gear teeth (or tooth tip surfaces) of the crown gears makes it possible to increase the thickness of a portion of each pinion gear inward of each pinion tooth bottom surface in a region adjacent to the outer periphery of the crown gears, and to allow each pinion tooth bottom surface of the pinion gears to be substantially parallel to a line of contact with the gear tooth of the crown gear in the vicinity of the tooth root of the pinion tooth. As a result, stress acting on the tooth roots of the pinion teeth in accordance with meshing of the pinion teeth with the gear teeth of the crown gears is reducible while the pinion gears are reduced in diameter. This makes it possible to increase the durability of each pinion gear while making the differential gear mechanism compact in size.

DETAILED DESCRIPTION

Exemplary embodiments of the present disclosure will be described below with reference to the drawings.

Figure 1:
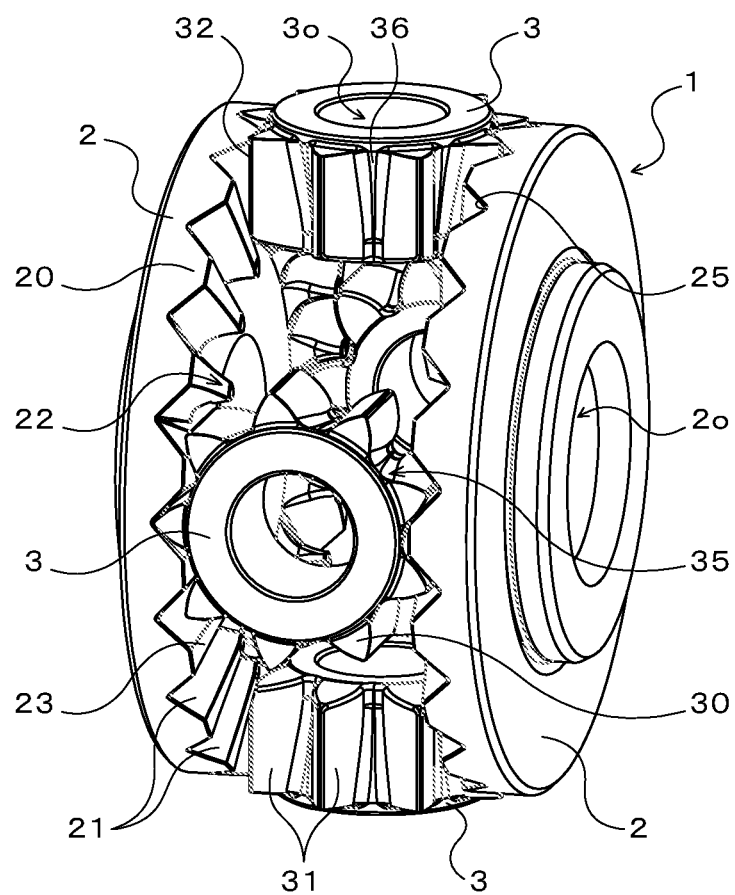
FIG. 1 is a perspective view of a differential gear mechanism according to the present disclosure.
Figure 2:
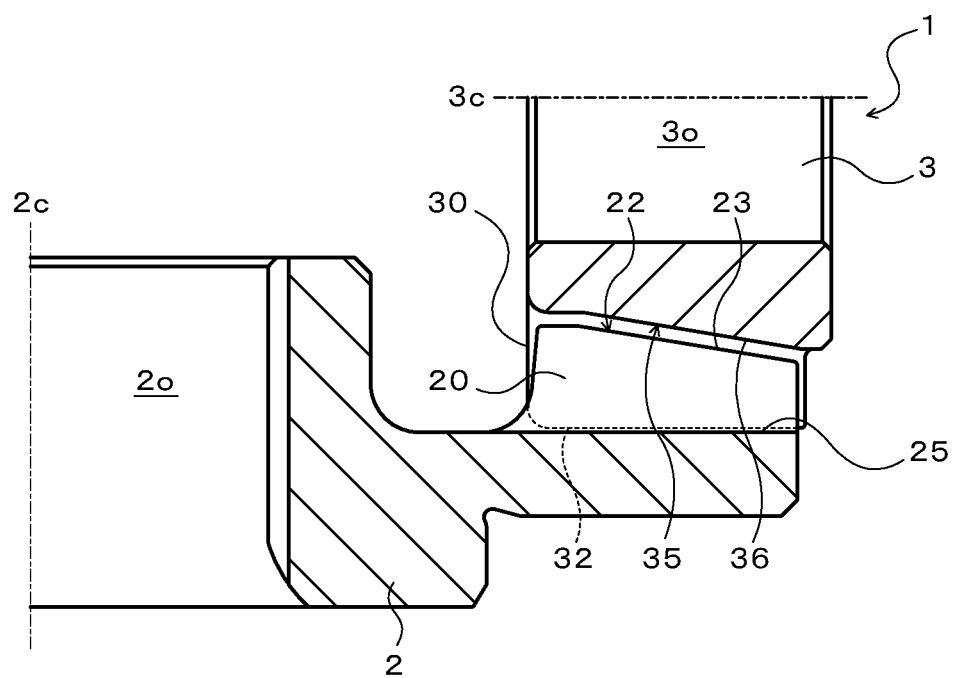
FIG. 2 is a partial cross-sectional view of the differential gear mechanism according to the present disclosure.

FIG. 1 is a perspective view of a differential gear mechanism 1 according to the present disclosure. FIG. 2 is a partial cross-sectional view of main components of the differential gear mechanism 1. The differential gear mechanism 1 illustrated in these drawings is included in a differential gear to be installed on a vehicle together with, for example, a differential ring gear and a differential case (which are not illustrated). The differential gear mechanism 1 includes a pair of coaxially disposed crown gears (face gears) 2 and a plurality of pinion gears 3 in mesh with the pair of crown gears 2. In the present embodiment, the number of pinion gears 3 is, for example, four. The pair of crown gears 2 is secured to a drive shaft (not illustrated) and functions as side gears of the differential gear. Pinion shafts are each supported by the differential case and extend radially such that the pinion shafts are perpendicular to an axial direction of the pair of crown gears 2. Each pinion gear 3 has an associated one of the pinion shafts inserted therethrough and is thus rotatably supported by the differential case.

The crown gears 2 are bevel gears each having a flat pitch surface. The crown gears 2 each include: a shaft hole 2o to which the drive shaft is secured; gear teeth 20 protruding in parallel with an axis 2c (see FIG. 2); and tooth bottoms 25 (see FIG. 1) each located between adjacent ones of the gear teeth 20. Each gear tooth 20 includes: a pair of tooth surfaces 21 created in accordance with tooth surfaces of the pinion gears 3; and a tooth tip surface 22 that is a flat surface or a convex curved surface defined between the pair of tooth surfaces 21. As illustrated in FIG. 2, the tooth tip surface 22 of each gear tooth 20 includes an inclined portion 23 inclined such that the tooth tip surface 22 approaches the tooth bottom 25 as the tooth tip surface 22 extends from a region adjacent to the axis $2c$ of the crown gears 2 (i.e., a left side region in FIG. 2) toward a region adjacent to the outer periphery of the crown gears 2 (i.e., a right side region in FIG. 2).

Figure 3:
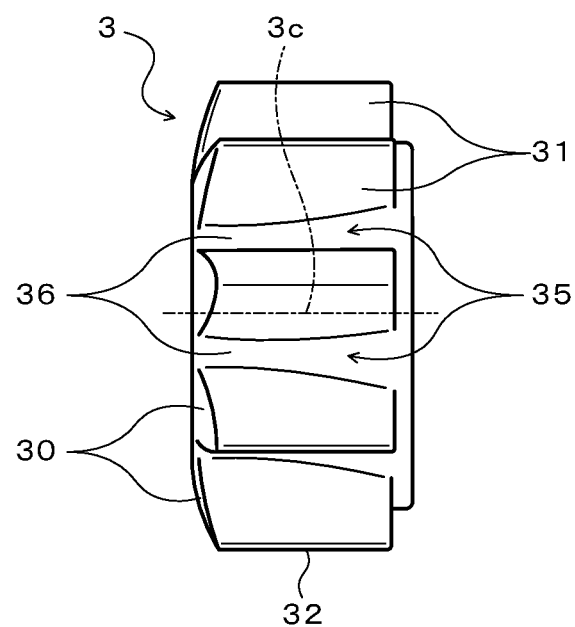
FIG. 3 is a plan view of a pinion gear included in the differential gear mechanism according to the present disclosure.

As illustrated in FIGS. 1 and 2, each pinion gear 3 is a spur gear that includes: a pinion shaft hole 3o through which the associated pinion shaft (not illustrated) is to be inserted; pinion teeth 30 each having a tooth trace extending in parallel with an axis $3c$; and pinion tooth bottom surfaces 35 each located between adjacent ones of the pinion teeth 30. In the present embodiment, each pinion tooth 30 includes: a pair of tooth surfaces 31 each defined by an involute curve; and a pinion tooth tip 32 (see FIG. 1) defined such that the pinion tooth tip 32 extends in parallel with the axis $3c$ between the pair of tooth surfaces 31. As illustrated in FIG. 2, each pinion tooth bottom surface 35 of the pinion gears 3 includes an inclined portion 36 inclined such that the pinion tooth bottom surface 35 approaches the pinion tooth tip 32 as the pinion tooth bottom surface 35 extends from a region adjacent to the axis $2c$ of the crown gears 2 (i.e., a left side region in FIG. 2) toward a region adjacent to the outer periphery of the crown gears 2 (i.e., a right side region in FIG. 2). Thus, as illustrated in FIG. 2, a distance (thickness) between each pinion tooth bottom surface (root circle) 35 and the inner peripheral surface of the pinion shaft hole 3o (or the pinion gear 3) increases as the pinion tooth bottom surface 35 extends from the region adjacent to the axis $2c$ of the crown gears 2 (i.e., a region adjacent to the inner periphery of the crown gears 2 or the left side region in FIG. 2) toward the region adjacent to the outer periphery of the crown gears 2 (i.e., the right side region in FIG. 2). As illustrated in FIG. 3, when the pinion tooth bottom surface 35 is seen in a plan view, the pinion tooth bottom surface 35 narrows as it extends from a region adjacent to the outer periphery of the crown gears 2 (i.e., a right side region in FIG. 3) toward a region adjacent to the axis $2c$ of the crown gears 2 (i.e., a region adjacent to the inner periphery of the crown gears 2 or a left side region in FIG. 3). The tooth thickness of each pinion tooth 30 in the vicinity of its tooth root increases as the pinion tooth 30 extends from a region adjacent to the outer periphery of the crown gears 2 toward a region adjacent to the axis $2c$.

Referring to FIGS. 4 to 7, a procedure for designing the foregoing gear mechanism 1 (or more specifically, the tooth tip surfaces 22 of the gear teeth 20 of each crown gear 2 and the pinion tooth bottom surfaces 35 of each pinion gear 3) will be described below.

When the tooth surfaces 31 of the pinion teeth 30 of the pinion gears 3 are each defined by an involute curve, let us assume that the axis $3c$ of each pinion gear 3 is a z axis, a fixed coordinate system whose origin point o is a point at which a common normal to the axis $2c$ of the crown gears 2 and the axis $3c$ of the pinion gear 3 intersects the axis $3c$ is denoted by "o-xyz", and a coordinate of any point in the o-xyz coordinate system located on the tooth surface 31 in an axially perpendicular cross section on the supposition that z=v is denoted by "r". Then, the coordinate r is representable by Eq. (1) below.

[Mathematical Expression 1]

Figure 4:
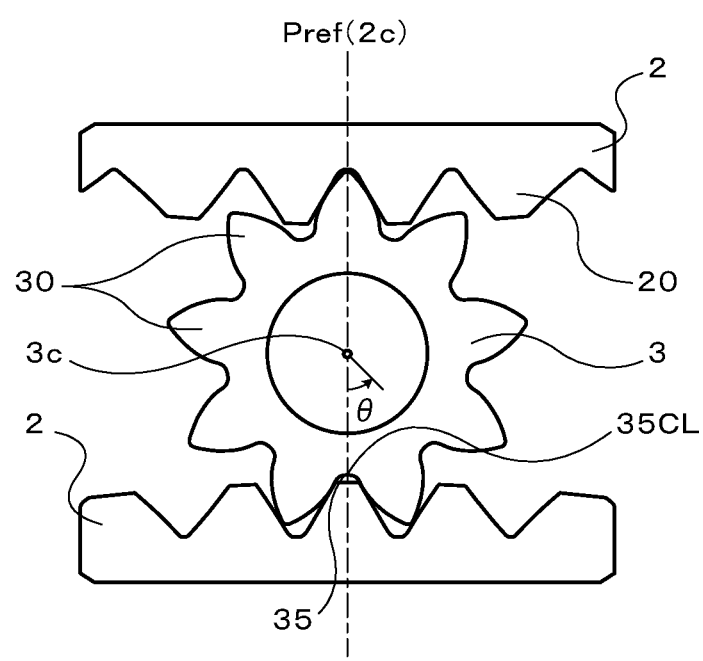
FIG. 4 is an explanatory diagram for describing a procedure for designing the differential gear mechanism according to the present disclosure.

In Eq. (1), "$r_b$" denotes a radius of a base circle of each pinion gear 3, "u" denotes a gradually widening angle that defines an involute curve, and "θ" denotes a rotation angle of each pinion gear 3. "φ" is as indicated in Eq. (2) below. "v*" is "v" that satisfies a contact conditional expression n·w=0 and is as indicated in Eq. (3). "$\eta_b$" in Eq. (2) is as indicated in Eq. (4) below. "i" in Eq. (3) denotes a gear ratio ($Z_C/Z_P$) between the number of teeth $Z_P$ of the pinion gear 3 and the number of teeth $Z_C$ of the crown gear 2. In Eq. (4), "α" denotes a pressure angle, and "x" denotes a transfer coefficient. The upper equation of each compound expression represents a right tooth surface, and the lower equation of each compound expression represents a left tooth surface. As illustrated in FIG. 4, each pinion gear 3 rotates on the assumption that a state where a plane Pref including the axis 2c of the pair of crown gears 2 and the axis 3c of the pinion gear 3 (which will hereinafter be referred to as a "reference plane") passes through a center line 35CL (center) of any one of the pinion tooth bottom surfaces 35 is a reference state, θ=0° in the state illustrated in FIG. 4, and the counterclockwise direction in FIG. 4 is a positive rotational direction.

[Mathematical Expression 2]

The coordinate r of any point on the tooth surface 31 in the o-xyz coordinate system is projected onto (or converted into) a $o_2$-$x_2y_2z_2$ coordinate system that rotates together with the crown gears 2, thus obtaining a coordinate $r_2$. The coordinate $r_2$ is represented as indicated in Eq. (5) below. The coordinate $r_2$ denotes a coordinate of a point on the tooth surface 21 of the gear tooth 20 in contact with the tooth surface 31 of the pinion tooth 30 of the pinion gear 3. In Eq. (5), "e" denotes an amount of offset between the axis 2c of the pair of crown gears 2 and the axis 3c of the pinion gear 3, and "$r_p$" denotes a radius of a base circle of the pinion gear 3. A $z_2$ axis of the $o_2$-$x_2y_2z_2$ coordinate system is the axis 2c of the pair of crown gears 2, and an origin point $o_2$ of the $o_2$-$x_2y_2z_2$ coordinate system is a point located away from an intersection of the axis 2c of the crown gears 2 and the common normal by the radius $r_p$ of the base circle of the pinion gear 3. For more details about, for example, a procedure for deriving Eq. (1) to Eq. (5) described above, see "Geometrical Design of Face Gear" written by Hiroshi Gunbara (Transactions of the Japan Society of Mechanical Engineers Series C, Vol. 73, No. 726 (2007-2)).

[Mathematical Expression 3]

Figure 5:
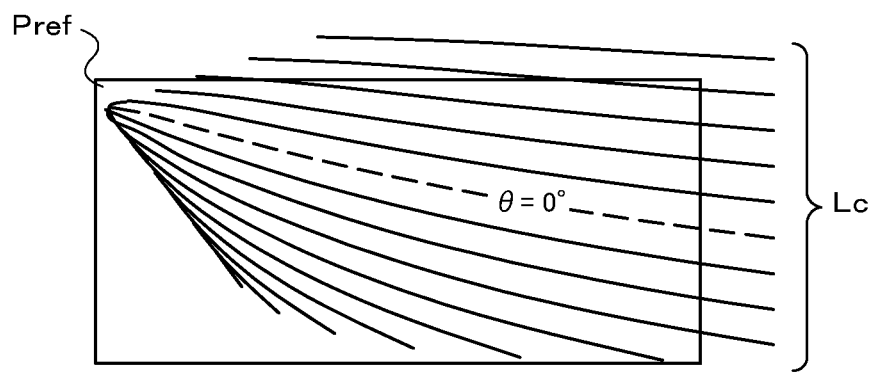
FIG. 5 is an explanatory diagram for describing the procedure for designing the differential gear mechanism according to the present disclosure.

In designing the tooth tip surfaces 22 of the gear teeth 20 of each crown gear 2 and the pinion tooth bottom surfaces 35 of each pinion gear 3, the present embodiment involves using Eq. (5) described above, so that a plurality of contact lines between the gear tooth 20 and the pinion tooth 30 is defined on the tooth surface 21 of the gear tooth 20 of the crown gear 2 at a predetermined angle Δθ around the axis 3c of the pinion gear 3. The angle Δθ is, for example, 5° such that an interval between the contact lines adjacent to each other on the tooth surface 21 is smaller than a chamfering radius of a chamfered portion formed between the tooth surface 21 and the tooth tip surface 22 of the gear tooth 20 of the crown gear 2. A plurality of contact lines on the tooth surface 21 of the gear tooth 20 of the crown gear 2 is projected onto the above-mentioned reference plane Pref around the axis 3c of the pinion gear 3, thus obtaining a plurality of contact lines Lc on the reference plane Pref as illustrated in FIG. 5. The broken line in FIG. 5 indicates the contact line Lc when the rotation angle θ of the pinion gear 3 is 0°.

For a contact ratio between each crown gear 2 (i.e., the gear teeth 20 thereof) and the pinion gear 3 (i.e., the pinion teeth 30 thereof) to be 1.0 or higher, it is necessary to provide contact lines, the number of which is $360/Z_P/\Delta\theta$ or more, at the angle Δθ on the tooth surface 21 of the gear tooth 20 of the crown gear 2 while the pinion gear 3 rotates by one pinion tooth 30, i.e., $360/Z_P$ (°). On the basis of this fact, the present embodiment involves defining the plurality of contact lines Lc on the reference plane Pref, and then selecting, from among the plurality of contact lines Lc, a contact line Lc (n+1) located opposite to the tooth bottom 25 of the crown gear 2 (i.e., on the upper side in FIG. 6) relative to the contact lines Lc, the number of which is $360/Z_P/\Delta\theta$ or more, and a contact line Lc (n) located opposite to the tooth bottom 25 of the crown gear 2 relative to the contact line Lc (n+1) by a single line as illustrated in FIG. 6.

Figure 6:
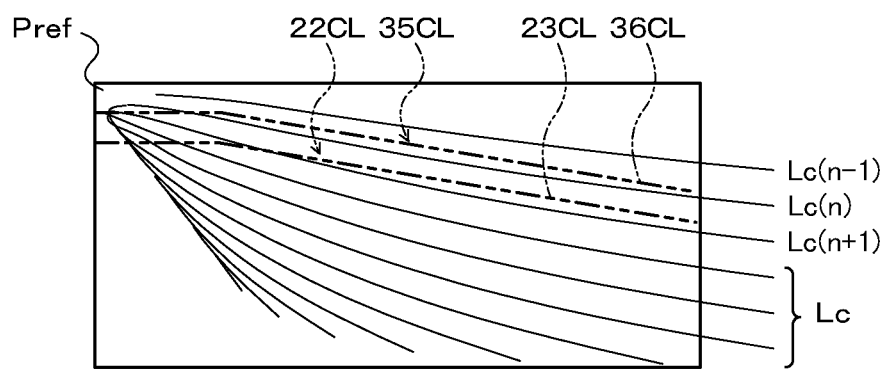
FIG. 6 is an explanatory diagram for describing the procedure for designing the differential gear mechanism according to the present disclosure.
Figure 7:
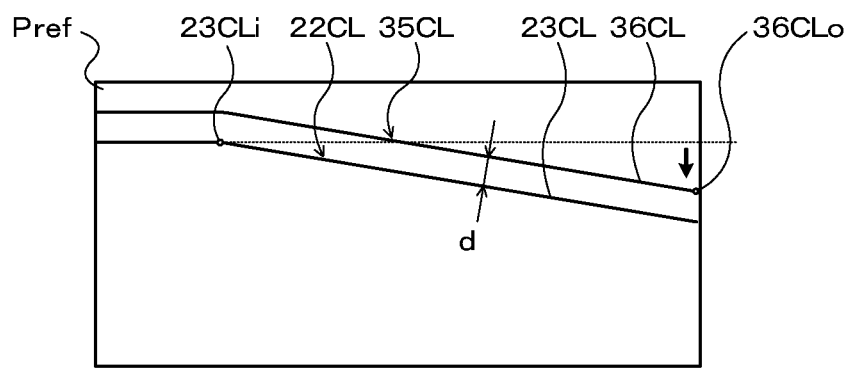
FIG. 7 is an explanatory diagram for describing the procedure for designing the differential gear mechanism according to the present disclosure.

After the contact lines Lc (n+1) and Lc (n) are selected, an inclined line 23CL is determined on the reference plane Pref as illustrated in FIG. 6. The inclined line 23CL is a straight line or a curved line passing through a range between the contact line Lc (n+1) and the contact line Lc (n). The range between the contact line Lc (n+1) and the contact line Lc (n) may include the contact line Lc (n+1) and the contact line Lc (n) themselves. The inclined line 23CL may be a portion of the contact line Lc (n+1) or Lc (n). As illustrated in FIGS. 6 and 7, a center line 22CL of the tooth tip surface 22 of the gear tooth 20 of the crown gear 2 is determined on the reference plane Pref such that the center line 22CL includes the inclined line 23CL, and a tooth tip adjustment is carried out as appropriate so as to obtain a final center line 22CL of the tooth tip surface 22. In accordance with the center line 22CL obtained, the shape of the tooth tip surface 22 is determined.

The center line 35CL of the pinion tooth bottom surface 35 of the pinion gear 3 (see FIGS. 6 and 7) is determined such that the center line 35CL includes an inclined line 36CL extending along the inclined line 23CL included in the center line 22CL of the tooth tip surface 22 of the gear tooth 20. In the present embodiment, the inclined line 36CL is determined such that the inclined line 36CL extends in parallel with the inclined line 23CL. In this case, as illustrated in FIG. 7, an outer end 36CLo of the inclined line 36CL included in the center line 35CL of the pinion tooth bottom surface 35 (which is an end of the inclined line 36CL adjacent to the outer periphery of the crown gears 2) is located (downwardly in FIG. 7) farther away from the axis 3c of the pinion gear 3 in the axial direction of the pair of crown gears 2 (i.e., the up-down direction in FIG. 7) than an inner end 23CLi of the inclined line 23CL included in the center line 22CL of the tooth tip surface 22 (which is an end of the inclined line 23CL adjacent to the axis 2c of the pair of crown gears 2). After the center line 35CL is determined in this manner, the shape of the pinion tooth bottom surface 35 of the pinion gear 3 including the inclined portion 36 is determined in accordance with the center line 35CL such that the pinion tooth bottom surface 35 does not interfere with the gear teeth 20 (or the tooth tip surfaces 22) of the crown gears 2. The inclined line 23CL included in the center line 22CL of the tooth tip surface 22 and the inclined line 36CL included in the center line CL of the pinion tooth bottom surface 35 do not necessarily have to be in parallel with each other if a distance d therebetween is constant in the axial direction of the pinion gear 3 (i.e., the right-left direction in FIG. 7).

As previously described, the differential gear mechanism 1 is designed such that the center line 22CL of the tooth tip surface 22 of the gear tooth 20, projected onto the reference plane Pref including the axis 2c of the pair of crown gears 2, includes the inclined line 23CL passing through the range between the two contact lines Lc (n+1) and Lc (n) which are selected from the plurality of contact lines Lc between the gear tooth 20 and the pinion tooth 30 projected onto the reference plane Pref and by which the contact ratio between the crown gear 2 and the pinion gear 3 is 1.0 or higher.

Thus, forming the inclined portion 36 on each pinion tooth bottom surface 35 of the pinion gear 3 such that each pinion tooth bottom surface 35 does not interfere with the gear teeth 20 (or the tooth tip surfaces 22) of the crown gears 2 makes it possible to increase a distance between each pinion tooth bottom surface 35 and the inner peripheral surface of the pinion shaft hole 3o (or the pinion gear 3) in a region adjacent to the outer periphery of the crown gears 2, i.e., the thickness of a portion of the pinion gear 3 inward of the pinion tooth bottom surface 35, while allowing the pinion gear 3 to have a sufficient tooth thickness in the vicinity of the tooth root of each pinion tooth 30 in a region adjacent to the axis 2c of the crown gears 2. If each pinion gear 3 deflects during, in particular, high torque transmission and positions where the gear teeth 20 of the crown gears 2 are in mesh with the pinion teeth 30 deviate toward the outer periphery of the crown gears 2, each pinion tooth bottom surface 35 of the pinion gears 3 would be allowed to be substantially parallel to a line of contact with the gear tooth 20 of the crown gear 2 in the vicinity of the tooth root of the pinion tooth 30. As a result, stress acting on the tooth roots of the pinion teeth 30 in accordance with meshing of the pinion teeth 30 with the gear teeth 20 of the crown gears 2 is reducible while the diameter of each pinion gear 3 is reduced. This makes it possible to increase the durability of each pinion gear 3 while making the differential gear mechanism 1 compact in size.

As previously mentioned, the two contact lines Lc (n+1) and Lc (n) are selected such that $360/Z_P/\Delta\theta$ or more contact lines Lc are provided in a region of the reference plane Pref closer to the tooth bottom 25 of the crown gear 2 than the center line 22CL of the tooth tip surface 22 (i.e., a lower region of the reference plane Pref in FIG. 6). This enables the differential gear mechanism 1 to have a favorable contact ratio between the crown gears 2 (or the gear teeth 20 thereof) and the pinion gears 3 (or the pinion teeth 30 thereof).

The differential gear mechanism 1, however, may be designed in accordance with a procedure described below. Specifically, this procedure involves defining a plurality of contact lines Lc on the reference plane Pref, and then selecting, from among the plurality of contact lines Lc, a contact line Lc (n) located opposite to the tooth bottom 25 of the crown gear 2 relative to the contact lines Lc, the number of which is $360/Z_P/\Delta\theta+1$ or more, and a contact line Lc (n−1) located opposite to the tooth bottom 25 of the crown gear 2 relative to the contact line Lc (n) by a single line as illustrated in FIG. 6. In this case, an inclined line 36CL is determined on the reference plane Pref as illustrated in FIG. 6. The inclined line 36CL is a straight line or a curved line such that the inclined line 36CL passes through a range between the contact line Lc (n) and the contact line Lc (n−1). The inclined line 36CL may be a portion of the contact line Lc (n) or Lc (n−1). As illustrated in FIGS. 6 and 7, a center line 35CL of the pinion tooth bottom surface 35 of the pinion gear 3 is determined on the reference plane Pref such that the center line 35CL includes the inclined line 36CL, and a tooth bottom adjustment is carried out as appropriate so as to obtain a final center line 35CL of the pinion tooth bottom surface 35. In accordance with the center line 35CL obtained, the shape of the pinion tooth bottom surface 35 is determined.

A center line 22CL of the tooth tip surface 22 of the gear tooth 20 is determined such that the center line 22CL includes an inclined line 23CL extending along (or in parallel with) the inclined line 36CL included in the center line 35CL of the pinion tooth bottom surface 35. Also in this case, as illustrated in FIG. 7, an outer end 36CLo of the inclined line 36CL included in the center line 35CL of the pinion tooth bottom surface 35 is located (downwardly in FIG. 7) farther away from the axis 3c of the pinion gear 3 in the axial direction of the pair of crown gears 2 (i.e., the up-down direction in FIG. 7) than an inner end 23CLi of the inclined line 23CL included in the center line 22CL of the tooth tip surface 22. After the center line 22CL is determined in this manner, the shape of the tooth tip surface 22 including the inclined portion 23 is determined in accordance with the center line 22CL such that the tooth tip surface 22 does not interfere with the pinion teeth 30 (or the pinion tooth bottom surfaces 35) of the pinion gear 3. Also in this case, the inclined line 23CL included in the center line 22CL of the tooth tip surface 22 and the inclined line 36CL included in the center line CL of the pinion tooth bottom surface 35 do not necessarily have to be in parallel with each other if the distance d therebetween is constant in the axial direction of the pinion gear 3 (i.e., the right-left direction in FIG. 7).

As previously described, the differential gear mechanism 1 may be designed such that the center line 35CL of the pinion tooth bottom surface 35 of the pinion gear 3, projected onto the reference plane Pref including the axis 2c of the pair of crown gears 2, includes the inclined line 36CL passing through the range between the two contact lines Lc (n) and Lc (n−1) which are selected from the plurality of contact lines Lc between the gear tooth 20 and the pinion tooth 30 projected onto the reference plane Pref and by which the contact ratio between the crown gear 2 and the pinion gear 3 is 1.0 or higher.

This makes it possible to increase a distance between each pinion tooth bottom surface 35 and the inner peripheral surface of the pinion shaft hole 3o (or the pinion gear 3) in a region adjacent to the outer periphery of the crown gears 2, i.e., the thickness of a portion of the pinion gear 3 inward of the pinion tooth bottom surface 35, while allowing the pinion gear 3 to have a sufficient tooth thickness in the vicinity of the tooth root of each pinion tooth 30 in a region adjacent to the axis 2c of the crown gears 2. If each pinion gear 3 deflects during, in particular, high torque transmission and positions where the gear teeth 20 of the crown gears 2 are in mesh with the pinion teeth 30 deviate toward the outer periphery of the crown gears 2, each pinion tooth bottom surface 35 of the pinion gears 3 would be allowed to be substantially parallel to a line of contact with the gear tooth 20 of the crown gear 2 in the vicinity of the tooth root of the pinion tooth 30. As a result, stress acting on the tooth roots of the pinion teeth 30 in accordance with meshing of the pinion teeth 30 with the gear teeth 20 of the crown gears 2 is reducible while the diameter of each pinion gear 3 is reduced. This makes it possible to increase the durability of each pinion gear 3 while making the differential gear mechanism 1 compact in size.

The two contact lines Lc (n) and Lc (n−1) are selected such that $360/Z_P/\Delta\theta+1$ or more contact lines Lc are provided in a region of the reference plane Pref closer to the tooth bottom 25 of the crown gear 2 than the center line 22CL of the tooth tip surface 22 (i.e., a lower region of the reference plane Pref in FIG. 6). This enables the differential gear mechanism 1 to have a favorable contact ratio between the crown gears 2 (or the gear teeth 20 thereof) and the pinion gears 3 (or the pinion teeth 30 thereof).

The present embodiment may involve defining the plurality of contact lines Lc on the reference plane Pref, and then selecting, from among the plurality of contact lines Lc, a contact line Lc (n+1) located opposite to the tooth bottom 25 of the crown gear 2 (i.e., on the upper side in FIG. 6) relative to the contact lines Lc, the number of which is $360/Z_P/\Delta\theta$ or more, a contact line Lc (n) located opposite to the tooth bottom 25 of the crown gear 2 relative to the contact line Lc (n+1) by a single line, and a contact line Lc (n−1) located opposite to the tooth bottom 25 of the crown gear 2 relative to the contact line Lc (n) by a single line. In this case, a center line 22CL of the tooth tip surface 22 of the gear tooth 20 is determined on the reference plane Pref such that the center line 22CL includes an inclined line 23CL that is a straight line or a curved line passing through a range between the contact line Lc (n+1) and the contact line Lc (n), and a tooth tip adjustment is carried out as appropriate so as to obtain a final center line 22CL of the tooth tip surface 22. A center line 35CL of the pinion tooth bottom surface 35 of the pinion gear 3 is determined on the reference plane Pref such that the center line 35CL includes an inclined line 36CL that is a straight line or a curved line passing through a range between the contact line Lc (n) and the contact line Lc (n−1), and a tooth bottom adjustment is carried out as appropriate so as to obtain a final center line 35CL of the pinion tooth bottom surface 35. Designing the differential gear mechanism 1 by following this procedure also makes it possible to increase the durability of each pinion gear 3 while making the differential gear mechanism 1 compact in size.

Designing the differential gear mechanism 1 as described above makes it possible to design the differential gear mechanism 1 such that the contact ratio is basically between 1.0 and 1.2 inclusive. The differential gear mechanism 1, however, may be designed such that the contact ratio is less than 1.0 when higher priority is given to making an entirety of the differential gear mechanism 1 compact in size and/or increasing the durability of the pinion gears 3. When a sufficient installation space, for example, is available for the differential gear mechanism 1, the differential gear mechanism 1 may be designed such that the contact ratio is higher than 1.2. The differential gear mechanism 1 is included in, but not limited to, a differential gear to be installed on a vehicle. Specifically, the differential gear mechanism 1 may be included in, for example, a transfer (or a center differential thereof) for a four-wheel-drive vehicle. The pinion teeth 30 of the pinion gears 3 may each include a pair of tooth surfaces 31 defined by a curve other than an involute curve, such as an arc or a cycloid curve, for example. Designing the differential gear mechanism 1 may involve defining a plurality of contact lines between the gear tooth 20 and the pinion tooth 30 on the tooth surface 31 of the pinion tooth 30 of the pinion gear 3 at the predetermined angle Δθ around the axis 3c of the pinion gear 3, and then projecting the plurality of contact lines on the reference plane Pref.

As described thus far, a differential gear mechanism according to the present disclosure is a differential gear mechanism (1) including a pair of crown gears (2) and a plurality of pinion gears (3) in mesh with the pair of crown gears (2). A tooth tip surface (22) of each gear tooth (20) of the crown gears (2) includes an inclined portion (23) inclined such that the tooth tip surface (22) approaches a tooth bottom (25) as the tooth tip surface (22) extends from a region adjacent to an axis (2c) of the pair of crown gears (2) toward a region adjacent to an outer periphery of the pair of crown gears (2). Each pinion tooth bottom surface (35) located between adjacent pinion teeth (30) of the pinion gears (3) includes an inclined portion (36) inclined such that the pinion tooth bottom surface (35) approaches a pinion tooth tip (32) as the pinion tooth bottom surface (35) extends from a region adjacent to the axis (2c) of the pair of crown gears (2) toward a region adjacent to the outer periphery of the pair of crown gears (2). When a plurality of contact lines between the gear tooth (20) and the pinion tooth (30) is defined on either a tooth surface (21) of the gear tooth (20) of the crown gear (2) or a tooth surface (31) of the pinion tooth (30) of the pinion gear (3) at a predetermined angle (Δθ) around an axis (3c) of the pinion gear (3), and the plurality of contact lines and a center line (22CL) of the tooth tip surface (22) of the gear tooth (20) are projected onto a plane (Pref), including the axis (2c) of the pair of crown gears (2), around the axis (3c) of the pinion gear (3), the center line (22CL) of the tooth tip surface (22) projected onto the plane (Pref) includes an inclined line (23CL) passing through a range between two of the contact lines (Lc (n+1), Lc (n)) which are selected from the plurality of contact lines (Lc) projected onto the plane (Pref) and by which a contact ratio is 1.0 or higher.

The differential gear mechanism according to the present disclosure is designed such that the center line of the tooth tip surface of the gear tooth of the crown gear, projected onto the plane including the axis of the pair of crown gears, includes the inclined line passing through the range between two of the contact lines which are selected from the plurality of contact lines between the gear tooth of the crown gear and the pinion tooth projected onto the plane and by which the contact ratio is 1.0 or higher. Thus, forming the inclined portion on each pinion tooth bottom surface of the pinion gears such that each pinion tooth bottom surface does not interfere with the gear teeth (or the tooth tip surfaces) of the crown gears makes it possible to increase the thickness of a portion of each pinion gear inward of each pinion tooth bottom surface in a region adjacent to the outer periphery of the crown gears, and to allow each pinion tooth bottom surface of the pinion gears to be substantially parallel to a line of contact with the gear tooth of the crown gear in the vicinity of the tooth root of the pinion tooth. As a result, stress acting on the tooth roots of the pinion teeth in accordance with meshing of the pinion teeth with the gear teeth of the crown gears is reducible while the diameter of each pinion gear is reduced. This makes it possible to increase the durability of each pinion gear while making the differential gear mechanism compact in size.

When the number of teeth of each of the pinion gears (3) is denoted by "$Z_P$" and the predetermined angle is denoted by "Δθ(°)", the two contact lines (Lc (n+1), Lc (n)) may be selected such that the contact lines (Lc), the number of which is $360/Z_P/\Delta\theta$ or more, are provided in a region of the plane (Pref) closer to the tooth bottom (25) of the crown gear (2) than the center line (22CL) of the tooth tip surface (22). This enables the differential gear mechanism to have a favorable contact ratio between the crown gears (or the gear teeth thereof) and the pinion gears (or the pinion teeth thereof).

When a center line (35CL) of the pinion tooth bottom surface (35) is projected onto the plane (Pref) around the axis (3c) of the pinion gear (3), the center line (35CL) of the pinion tooth bottom surface (35) projected onto the plane (Pref) may include an inclined line (36CL) extending along the inclined line (23CL) included in the center line (22CL) of the tooth tip surface (22). On the plane (Pref), an outer end (36CLo) of the inclined line (36CL) included in the center line (35CL) of the pinion tooth bottom surface (35) may be located farther away from the axis (3c) of the pinion gear (3) in an axial direction of the pair of crown gears (2) than an inner end (23CLi) of the inclined line (23CL) included in the center line (22CL) of the tooth tip surface (22).

On the plane (Pref), a distance (d) between the inclined line (23CL) included in the center line (22CL) of the tooth tip surface (22) and the inclined line (36CL) included in the center line (35CL) of the pinion tooth bottom surface (35) may be constant in an axial direction of the pinion gear (3).

Another differential gear mechanism according to the present disclosure is a differential gear mechanism (1) including a pair of crown gears (2) and a plurality of pinion gears (3) in mesh with the pair of crown gears (2). A tooth tip surface (22) of each gear tooth (20) of the crown gears (2) includes an inclined portion (23) inclined such that the tooth tip surface (22) approaches a tooth bottom (25) as the tooth tip surface (22) extends from a region adjacent to an axis (2c) of the pair of crown gears (2) toward a region adjacent to an outer periphery of the pair of crown gears (2). Each pinion tooth bottom surface (35) located between adjacent pinion teeth (30) of the pinion gears (3) includes an inclined portion (36) inclined such that the pinion tooth bottom surface (35) approaches a pinion tooth tip (32) as the pinion tooth bottom surface (35) extends from a region adjacent to the axis (2c) of the pair of crown gears (2) toward a region adjacent to the outer periphery of the pair of crown gears (2). When a plurality of contact lines between the gear tooth (20) and the pinion tooth (30) is defined on either a tooth surface (21) of the gear tooth (20) of the crown gear (2) or a tooth surface (31) of the pinion tooth (30) of the pinion gear (3) at a predetermined angle ($\Delta\theta$) around an axis (3c) of the pinion gear (3), and the plurality of contact lines and a center line (35CL) of the pinion tooth bottom surface (35) of the pinion gear (3) are projected onto a plane (Pref), including the axis (2c) of the pair of crown gears (2), around the axis (3c) of the pinion gear (3), the center line (35CL) of the pinion tooth bottom surface (35) projected onto the plane (Pref) includes an inclined line (36CL) passing through a range between two of the contact lines (Lc (n), Lc (n−1)) which are selected from the plurality of contact lines (Lc) projected onto the plane (Pref) and by which a contact ratio is 1.0 or higher.

This differential gear mechanism also enables an increase in the thickness of a portion of each pinion gear inward of each pinion tooth bottom surface in a region adjacent to the outer periphery of the crown gears and allows each pinion tooth bottom surface of the pinion gears to be substantially parallel to a line of contact with the gear tooth of the crown gear in the vicinity of the tooth root of the pinion tooth. As a result, stress acting on the tooth roots of the pinion teeth in accordance with meshing of the pinion teeth with the gear teeth of the crown gears is reducible while the diameter of each pinion gear is reduced. This makes it possible to increase the durability of each pinion gear while making the differential gear mechanism compact in size.

When the number of teeth of each of the pinion gears is denoted by "$Z_P$" and the predetermined angle is denoted by "$\Delta\theta(°)$", the two contact lines (Lc (n), Lc (n−1)) may be selected such that the contact lines (Lc), the number of which is $360/Z_P/\Delta\theta+1$ or more, are provided in a region of the plane (Pref) closer to the tooth bottom (25) of the crown gear (2) than the center line (35CL) of the pinion tooth bottom surface (35). This enables the differential gear mechanism to have a favorable contact ratio between the crown gears (or the gear teeth thereof) and the pinion gears (or the pinion teeth thereof).

When a center line (22CL) of the tooth tip surface (22) is projected onto the plane (Pref) around the axis (3c) of the pinion gear (3), the center line (22CL) of the tooth tip surface (22) projected onto the plane (Pref) may include an inclined line (23CL) extending along the inclined line (36CL) included in the center line (35CL) of the pinion tooth bottom surface (35). On the plane (Pref), an outer end (36CLo) of the inclined line (36CL) included in the center line (35CL) of the pinion tooth bottom surface (35) may be located farther away from the axis (3c) of the pinion gear (3) in an axial direction of the pair of crown gears (2) than an inner end (23CLi) of the inclined line (23CL) included in the center line (22CL) of the tooth tip surface (22).

On the plane (Pref), a distance (d) between the inclined line (23CL) included in the center line (22CL) of the tooth tip surface (22) and the inclined line (36CL) included in the center line (35CL) of the pinion tooth bottom surface (35) may be constant in an axial direction of the pinion gear (3).

In the differential gear mechanism (1), the contact ratio may be between 1.0 and 1.2 inclusive.

The differential gear mechanism (1) may be included in a differential gear to be installed on a vehicle.

A differential gear mechanism designing method according to the present disclosure is a method for designing a differential gear mechanism (1) including a pair of crown gears (2) and a plurality of pinion gears (3) in mesh with the pair of crown gears (2). The method includes: defining, on either a tooth surface (21) of a gear tooth (20) of the crown gear (2) or a tooth surface (31) of a pinion tooth (30) of the pinion gear (3), a plurality of contact lines between the gear tooth (20) and the pinion tooth (30) at a predetermined angle ($\Delta\theta$) around an axis (3c) of the pinion gear (3); projecting the plurality of contact lines onto a plane (Pref), including an axis (2c) of the pair of crown gears (2), around the axis (3c) of the pinion gear (3); and determining a center line (22CL) of a tooth tip surface (22) of the gear tooth (20) on the plane (Pref) such that the center line (22CL) includes an inclined line (23CL) passing through a range between two of the contact lines (Lc (n+1), Lc (n)) which are selected from the plurality of contact lines (Lc) projected onto the plane (Pref) and by which a contact ratio is 1.0 or higher.

Designing the differential gear mechanism in accordance with this method makes it possible to reduce stress acting on the tooth roots of the pinion teeth in accordance with meshing of the pinion teeth with the gear teeth of the crown gears while reducing the diameter of each pinion gear, thus increasing the durability of each pinion gear while making the differential gear mechanism compact in size.

On the plane (Pref), a center line (35CL) of a pinion tooth bottom surface (35) of the pinion gear (3) may be determined such that the center line (35CL) includes an inclined line (36CL) extending along the inclined line (23CL) included in the center line (22CL) of the tooth tip surface (22), and an outer end (36CLo) of the inclined line (36CL) included in the center line (35CL) of the pinion tooth bottom surface (35) may be located farther away from the axis (3c) of the pinion gear (3) in an axial direction of the pair of crown gears (2) than an inner end (23CLi) of the inclined line (23CL) included in the center line (22CL) of the tooth tip surface (22).

On the plane (Pref), a distance (d) between the inclined line (23CL) included in the center line (22CL) of the tooth tip surface (22) and the inclined line (36CL) included in the center line (35CL) of the pinion tooth bottom surface (35) may be constant in an axial direction of the pinion gear (3).

Another differential gear mechanism designing method according to the present disclosure is a method for designing a differential gear mechanism (1) including a pair of crown gears (2) and a plurality of pinion gears (3) in mesh with the pair of crown gears (2). The method includes: defining, on either a tooth surface (21) of a gear tooth (20) of the crown gear (2) or a tooth surface (31) of a pinion tooth (30) of the pinion gear (3), a plurality of contact lines between the gear tooth (20) and the pinion tooth (30) at a predetermined angle (Δθ) around an axis (3c) of the pinion gear (3); projecting the plurality of contact lines onto a plane (Pref), including an axis (2c) of the pair of crown gears (2), around the axis (3c) of the pinion gear (3); and determining a center line (35CL) of a pinion tooth bottom surface (35) of the pinion gear (3) on the plane (Pref) such that the center line (35CL) includes an inclined line (36CL) passing through a range between two of the contact lines (Lc (n), Lc (n−1)) which are selected from the plurality of contact lines (Lc) projected onto the plane (Pref) and by which a contact ratio is 1.0 or higher.

Designing the differential gear mechanism in accordance with this method makes it possible to reduce stress acting on the tooth roots of the pinion teeth in accordance with meshing of the pinion teeth with the gear teeth of the crown gears while reducing the diameter of each pinion gear, thus increasing the durability of each pinion gear while making the differential gear mechanism compact in size.

On the plane (Pref), a center line (22CL) of a tooth tip surface (22) of the gear tooth (20) may be determined such that the center line (22CL) includes an inclined line (23CL) extending along the inclined line (36CL) included in the center line (35CL) of the pinion tooth bottom surface (35), and an outer end (36CLo) of the inclined line (36CL) included in the center line (35CL) of the pinion tooth bottom surface (35) may be located farther away from the axis (3c) of the pinion gear (3) in an axial direction of the pair of crown gears (2) than an inner end (23CLi) of the inclined line (23CL) included in the center line (22CL) of the tooth tip surface (22).

On the plane (Pref), a distance (d) between the inclined line (23CL) included in the center line (22CL) of the tooth tip surface (22) and the inclined line (36CL) included in the center line (35CL) of the pinion tooth bottom surface (35) may be constant in an axial direction of the pinion gear (3).

The various different aspect of invention according to the present disclosure are not limited in any way to the embodiments described above. Various changes may naturally be made within the extensive range of the present disclosure. The embodiments described above each merely provide a specific form of the various aspects of the invention described in the section of SUMMARY OF THE DISCLOSURE and are thus not intended to limit the elements of the invention described in the section of SUMMARY OF THE DISCLOSURE.

INDUSTRIAL APPLICABILITY

The aspects of the present disclosure are applicable to, for example, the field of manufacture of differential gear mechanisms.

DESCRIPTION OF THE REFERENCE NUMERALS 1 differential gear mechanism
2 crown gear
2c axis
20 gear tooth
21 tooth surface
22 tooth tip surface
22CL center line
23 inclined portion
23CL inclined line
25 tooth bottom
3 pinion gear
3c axis
30 pinion tooth
31 tooth surface
32 pinion tooth tip
35 pinion tooth bottom surface
35CL center line
36 inclined portion
36CL inclined line
Lc, Lc (n+1), Lc (n), Lc (n−1) contact line
Pref reference plane

The invention claimed is:

1. A differential gear mechanism comprising a pair of crown gears and a plurality of pinion gears in mesh with the pair of crown gears, wherein
   a tooth tip surface of each gear tooth of the crown gears includes an inclined portion inclined such that the tooth tip surface approaches a tooth bottom as the tooth tip surface extends from a region adjacent to an axis of the pair of crown gears toward a region adjacent to an outer periphery of the pair of crown gears,
   each pinion tooth bottom surface located between adjacent pinion teeth of the pinion gears includes an inclined portion inclined such that the pinion tooth bottom surface approaches a pinion tooth tip as the pinion tooth bottom surface extends from a region adjacent to the axis of the pair of crown gears toward a region adjacent to the outer periphery of the pair of crown gears, and
   when a plurality of contact lines between the gear tooth and the pinion tooth is defined on either a tooth surface of the gear tooth of the crown gear or a tooth surface of the pinion tooth of the pinion gear at a predetermined angle around an axis of the pinion gear, and the plurality of contact lines and a center line of the tooth tip surface of the gear tooth are projected onto a plane, including the axis of the pair of crown gears, around the axis of the pinion gear, the center line of the tooth tip surface projected onto the plane includes an inclined line passing through a range between two of the contact lines which are selected from the plurality of contact lines projected onto the plane and by which a contact ratio is 1.0 or higher.

2. The differential gear mechanism according to claim 1, wherein when the number of teeth of each of the pinion gears is denoted by "$Z_P$" and the predetermined angle is denoted by "$\Delta\theta$ (°)", the two contact lines are selected such that the contact lines, the number of which is $360/Z_P/\Delta\theta$ or more, are provided in a region of the plane closer to the tooth bottom of the crown gear than the center line of the tooth tip surface.

3. The differential gear mechanism according to claim 2, wherein
   when a center line of the pinion tooth bottom surface is projected onto the plane around the axis of the pinion gear, the center line of the pinion tooth bottom surface projected onto the plane includes an inclined line extending along the inclined line included in the center line of the tooth tip surface, and on the plane, an outer end of the inclined line included in the center line of the pinion tooth bottom surface is located farther away from the axis of the pinion gear in an axial direction of the pair of crown gears than an inner end of the inclined line included in the center line of the tooth tip surface.

4. The differential gear mechanism according to claim 3, wherein on the plane, a distance between the inclined line included in the center line of the tooth tip surface and the inclined line included in the center line of the pinion tooth bottom surface is constant in an axial direction of the pinion gear.

5. The differential gear mechanism according to claim 4, wherein the contact ratio is between 1.0 and 1.2 inclusive.

6. The differential gear mechanism according to claim 5, wherein the differential gear mechanism is included in a differential gear to be installed on a vehicle.

7. A differential gear mechanism comprising a pair of crown gears and a plurality of pinion gears in mesh with the pair of crown gears, wherein
a tooth tip surface of each gear tooth of the crown gears includes an inclined portion inclined such that the tooth tip surface approaches a tooth bottom as the tooth tip surface extends from a region adjacent to an axis of the pair of crown gears toward a region adjacent to an outer periphery of the pair of crown gears,
each pinion tooth bottom surface located between adjacent pinion teeth of the pinion gears includes an inclined portion inclined such that the pinion tooth bottom surface approaches a pinion tooth tip as the pinion tooth bottom surface extends from a region adjacent to the axis of the pair of crown gears toward a region adjacent to the outer periphery of the pair of crown gears, and
when a plurality of contact lines between the gear tooth and the pinion tooth is defined on either a tooth surface of the gear tooth of the crown gear or a tooth surface of the pinion tooth of the pinion gear at a predetermined angle around an axis of the pinion gear, and the plurality of contact lines and a center line of the pinion tooth bottom surface of the pinion gear are projected onto a plane, including the axis of the pair of crown gears, around the axis of the pinion gear, the center line of the pinion tooth bottom surface projected onto the plane includes an inclined line passing through a range between two of the contact lines which are selected from the plurality of contact lines projected onto the plane and by which a contact ratio is 1.0 or higher.

8. The differential gear mechanism according to claim 7, wherein when the number of teeth of each of the pinion gears is denoted by "$Z_P$" and the predetermined angle is denoted by "$\Delta\theta$ (°)", the two contact lines are selected such that the contact lines, the number of which is $360/Z_P/\Delta\theta+1$ or more, are provided in a region of the plane closer to the tooth bottom of the crown gear than the center line of the pinion tooth bottom surface.

9. The differential gear mechanism according to claim 8, wherein
when a center line of the tooth tip surface is projected onto the plane around the axis of the pinion gear, the center line of the tooth tip surface projected onto the plane includes an inclined line extending along the inclined line included in the center line of the pinion tooth bottom surface, and
on the plane, an outer end of the inclined line included in the center line of the pinion tooth bottom surface is located farther away from the axis of the pinion gear in an axial direction of the pair of crown gears than an inner end of the inclined line included in the center line of the tooth tip surface.

10. The differential gear mechanism according to claim 9, wherein on the plane, a distance between the inclined line included in the center line of the tooth tip surface and the inclined line included in the center line of the pinion tooth bottom surface is constant in an axial direction of the pinion gear.

11. The differential gear mechanism according to claim 10, wherein the contact ratio is between 1.0 and 1.2 inclusive.

12. The differential gear mechanism according to claim 11, wherein the differential gear mechanism is included in a differential gear to be installed on a vehicle.

13. A method for designing a differential gear mechanism including a pair of crown gears and a plurality of pinion gears in mesh with the pair of crown gears, the differential gear mechanism designing method comprising:
defining, on either a tooth surface of a gear tooth of the crown gear or a tooth surface of a pinion tooth of the pinion gear, a plurality of contact lines between the gear tooth and the pinion tooth at a predetermined angle around an axis of the pinion gear;
projecting the plurality of contact lines onto a plane, including an axis of the pair of crown gears, around the axis of the pinion gear; and
determining a center line of a tooth tip surface of the gear tooth on the plane such that the center line includes an inclined line passing through a range between two of the contact lines which are selected from the plurality of contact lines projected onto the plane and by which a contact ratio is 1.0 or higher.

14. The differential gear mechanism designing method according to claim 13, wherein on the plane, a center line of a pinion tooth bottom surface of the pinion gear is determined such that the center line includes an inclined line extending along the inclined line included in the center line of the tooth tip surface, and an outer end of the inclined line included in the center line of the pinion tooth bottom surface is located farther away from the axis of the pinion gear in an axial direction of the pair of crown gears than an inner end of the inclined line included in the center line of the tooth tip surface.

15. The differential gear mechanism designing method according to claim 14, wherein on the plane, a distance between the inclined line included in the center line of the tooth tip surface and the inclined line included in the center line of the pinion tooth bottom surface is constant in an axial direction of the pinion gear.

* * * * *